US009092229B2

(12) United States Patent
Aljammaz et al.

(10) Patent No.: US 9,092,229 B2
(45) Date of Patent: Jul. 28, 2015

(54) SOFTWARE ANALYSIS SYSTEM AND METHOD OF USE

(75) Inventors: Muhammad Aljammaz, Clifton, VA (US); Edward J. Wegman, Fairfax Station, VA (US)

(73) Assignee: GEORGE MASON RESEARCH FOUNDATION, INC., Fairfax, VA (US)

( * ) Notice: Subject to any disclaimer, the term of this patent is extended or adjusted under 35 U.S.C. 154(b) by 356 days.

(21) Appl. No.: 13/463,629

(22) Filed: May 3, 2012

(65) Prior Publication Data

US 2012/0284691 A1 Nov. 8, 2012

Related U.S. Application Data

(60) Provisional application No. 61/483,238, filed on May 6, 2011.

(51) Int. Cl.
| | |
|---|---|
| *G06N 5/02* | (2006.01) |
| *G06F 9/44* | (2006.01) |
| *G06F 9/445* | (2006.01) |
| *G06F 21/00* | (2013.01) |

(52) U.S. Cl.
CPC .. *G06F 9/44* (2013.01); *G06F 8/60* (2013.01); *G06F 8/70* (2013.01); *G06F 21/00* (2013.01)

(58) Field of Classification Search
CPC ....... G06F 9/44; G06F 17/30985; G06F 2/00; G06F 8/60; G06F 8/70; G06N 5/02; G06N 5/046; G06N 5/047; G06N 99/005
USPC ............................................. 706/48; 717/120
See application file for complete search history.

(56) References Cited

U.S. PATENT DOCUMENTS

| | | | | |
|---|---|---|---|---|
| 5,452,442 | A  * | 9/1995 | Kephart | 714/38.1 |
| 8,239,948 | B1 * | 8/2012 | Griffin et al. | 726/24 |
| 8,291,497 | B1 * | 10/2012 | Griffin et al. | 726/23 |
| 8,321,942 | B1 * | 11/2012 | Chiueh et al. | 726/24 |
| 2010/0063785 | A1 * | 3/2010 | Pich et al. | 703/6 |
| 2010/0180344 | A1 * | 7/2010 | Malyshev et al. | 726/23 |
| 2011/0099635 | A1 * | 4/2011 | Silberman et al. | 726/24 |
| 2011/0271341 | A1 * | 11/2011 | Satish et al. | 726/23 |
| 2011/0302654 | A1 * | 12/2011 | Miettinen | 726/23 |

OTHER PUBLICATIONS

Sathyanarayan V. et al., "Signature Generation and Detection of Malware Families", ACISP 2008, LNCS 5107, pp. 336-349, 2008.*
Shankarapani M. et al., "Malware detection using assembly and API call sequences", J Comput Virol (2011) 7: pp. 107-119, 2010.*
Alazab M. et al., "Malware Detection Based on Structural and Behavioural Features of API Calls", Proceedings of the 1st International Cyber Resilience Conference, Edith Cowan University, Perth Western Australia, Aug. 23, 2010.*
Griffin K. et al., "Automatic Generation of String Signatures for Malware Detection", RAID 2009, LNCS 5758, pp. 101-120, 2009.*

(Continued)

*Primary Examiner* — Jeffrey A Gaffin
*Assistant Examiner* — Dave Misir
(74) *Attorney, Agent, or Firm* — DLA Piper LLP US

(57) ABSTRACT

Systems and Methods are utilized for determining a software signature. A software program in a form of a sequence of instructions of the software program is obained. The software program is clustered into a software family. A signature for each software family is generated.

16 Claims, 19 Drawing Sheets

(56) References Cited

OTHER PUBLICATIONS

Olivier Henchiri et al., "A Feature Selection and Evaluation Scheme for Computer Virus Detection", Proceedings of the Sixth International Conference on Data Mining (ICDM '06), pp. 891-895 (2006).
Matthew G. Schultz et al., "Data Mining Methods for Detection of New Malicious Executables", In Proceedings of the 2001 IEE Symposium on Security and Privacy, pp. 38-49, May 2001.
Jeremy Z. Kolter et al., "Learning to Detect Malicious Executables in the Wild", In Proceedings of the 10th ACM SGKDD International Conference on Knowledge Discovery and Data Mining (KDD'04), pp. 470-478, Aug. 22-25, 2004.
Tony Abou-Assaleh et al., "N-Gram-Based Detection of New Malicious Code", In Proceedings of the 28th Annual International Computer Software and Applications Conference—Workshops and Fast Abstracts (COMPSAC'04), pp. 41-42 (2004).
A.D. Michael Cai et al., "Detecting a Malicious Executable Without Prior Knowledge of its Patterns", In Proceedings of SPIE 5812, pp. 1-12 (2005).
Salvatore J. Stolfo et al., "Toward Stealthy Malware Detection", Advances in Information Security, vol. 27, pp. 231-249 (2007).
Jeffery O. Kephart et al., "Automatic Extraction of Computer Virus Signatures", In Proceedings of the 4th Virus Bulletin International Conference, pp. 178-184 (1994).
William Arnold et al., "Automatically Generated WIN32 Heuristic Virus Detection", In Proceedings of the 2000 Intenratinol Virus Bulletin Conference, pp. 51-60, Sep. 2000.
Gerald Tesauro et al., "Neural Networks for Computer Virus Recognition", IEEE Expert, vol. 11, No. 4, pp. 5-6, Aug. 1996.
S. Momina Tabish et al., "Malware Detection Using Statistical Analysis of Byte-Level File Content", In Proceedings of the ACM SGKDD Workshop on CyberSecurity and Intelligence Informatics, Jun. 28, 2009 (9 pages).
Hassan Khan et al., "Determining Malicious Executable Distinguishing Attributes and Low-Complexity Detection", Journal in Computer Virology, Jan. 27, 2010 (11 pages).
Zhiyu Wang et al., "A Multidisciplinary Approach for Online Detection of X86 Malicious Executables", Eighth Annual Communication Networks and Services Research Conference (CNSR), pp. 160-167, May 11-14, 2010.
Enamul Karim et al., "Malware Phylogeny Generation using Permutations of Code", Journal in Compter Virology (2005) (11 pages).
M. Siddiqui, "Data Mining Methods for Malware Detection", Disseration submitted in the College of Sciences at the University of Central Florida, (2008) (111 pags).
Igor Santos et al., "Idea: Opcode-Sequence-Based Malware Detection", Lecture Notes in Computer Science, pp. 35-43 (2010).
Daniel Bilar, "Opcodes as Predictor for Malware", Int. J. Electronic Security and Digital Forensics, vol. 1, No. 2, pp. 156-168 (2007).
VX Heavens, http://vx.netlux.org, updated Jul. 7, 2012 (3 pages).
Peter Miller, "Hexdump 1.7", http://miller.emu.id.au/pmiller/software/hexdump/, printed Jun. 10, 2013 (2 pages).
"Data Clustering Software", http://glaros.dtc.umn.edu/gkhome/views/cluto, (2011) (1 page).
"PEid 0.95", http://www.softpedia.com/get/Programming/Packers-Crypters-Protectors/PEid-updated.shtm, Nov. 6, 2008 (3 pages).
"Hex-Rays", http://www.hex-rays.com/products/ids/index.shtml, printed Nov. 20, 2012 (4 pages).
Scott Deerwester et al., "Indexing by Latent Semantic Analysis", Journal of the American Society for Infomratino Science, vol. 41, No. 6, pp. 391-407, Sep. 1990.
Susan T. Dumais et al., "Latent Semantic Indexing (LSI) and TREC-2", The Second Text Retrieval Conference (TREC-2), pp. 105-115 (1994).
S. Wasserman et al,. "Social Network Analysis: Methods and Applications", Cambridge University Press, New York, pp. 395 and 479 (1994).
A. Alfred et al., "Compilers, Priciples, Techniques and Tools", Reading, Massachusetts: Addison-Wesley, pp. 529 (1986).
Jason Hiner, "74% of Work PCs Still Run XP, and They're 4.4 Years Old", http://www.zdnet.com/blog/btl/74-of-work-pcs-run-xp-and-theyre-4-4-years-old/36641, Jul. 13, 2010 (9 pages).
David Marchette, "Class Cover Catch Digraphs", Wiley Interdisciplinary Reviews: Computation Statistics, vol. 2, pp. 171-177, Mar./Apr. 2010.
"Computer Viruses Make it to Orbit", http://news.bbc.co.uk/2/hi/technology/7583805.stm, Aug. 27, 2008 (2 pages).
"Annual Worldwide Economic Damages from Malware Exceed $13 Billion", http://computereconomics.com/article.cfm?id=1225, Jun. 2007 (2 pags).
Partick Doreian et al., "Generalized Blockmodeling", Cambridge University Press, pp. 1-3, Copyright 2005.
Linton c. Freeman, "The Development of Social Network Analysis: A Study in the Sociology of Science", Empirical Press, Copyright 2004, pp. ix-xi, and 1-205.
Edward J. Wegman et al., "Text Mining and Social Networks: Some Unexpected Connections", Presented at ACAS Oct. 23, 2008, Virginia Military Institute, Lexington, VA (43 pages).

\* cited by examiner

The Set of n-gram Actors

|  | n-gram#1 | n-gram#2 | n-gram#3 | n-gram#4 | n-gram#5 | n-gram#6 |
|---|---|---|---|---|---|---|
| Virus #1 | 10 | 30 | 20 | 2 | 5 | 9 |
| Virus #2 | 0 | 70 | 32 | 3 | 49 | 2 |
| Virus #3 | 50 | 2 | 100 | 60 | 90 | 22 |
| Virus #4 | 30 | 1 | 45 | 40 | 7 | 34 |
| Virus #5 | 5 | 9 | 10 | 80 | 60 | 22 |
| Virus #6 | 10 | 20 | 5 | 4 | 10 | 1 |
| Virus #7 | 30 | 50 | 40 | 2 | 6 | 0 |

The Set of Virus Actors

FIG. 4

610 A weighted two-mode n x m matrix is converted to a weighted one-mode matrix where A = one set of actors and B= second set of actors as, $$AB_{n \times m} \implies AA_{n \times n}$$

$$aa_{ij} = \sum_{k=1}^{m} 1 - |((ab_{ik} - ab_{jk}) / (ab_{ik} + ab_{jk} + 1))|$$

Note: $aa_{ij} = aa_{ji}$

620 A weighted two-mode n x m matrix is converted to a weighted one-mode matrix m x m matrix as, $$AB_{n \times m} \implies BB_{m \times m}$$

$$aa_{ij} = \sum_{k=1}^{n} 1 - |((ab_{ki} - ab_{kj}) / (ab_{ki} + ab_{kj} + 1))|$$

Note: $aa_{ij} = aa_{ji}$

FIG. 6

|          | Virus #1 | Virus #2 | Virus #3 | Virus #4 | Virus #5 | Virus #6 | Virus #7 |
|----------|----------|----------|----------|----------|----------|----------|----------|
| Virus #1 |          | 49.8373  | 89.8218  | 110.7634 | 39.5463  | 300.8298 | 30.7653  |
| Virus #2 | 49.8373  |          | 240.9821 | 198.6654 | 60.951   | 200.0982 | 100.8739 |
| Virus #3 | 89.8218  | 240.9821 |          | 95.0938  | 209.8375 | 50.904   | 398.2384 |
| Virus #4 | 110.7634 | 198.6654 | 95.0938  |          | 60.9881  | 239.7819 | 100.9834 |
| Virus #5 | 39.5463  | 60.951   | 209.8375 | 60.9881  |          | 209.1198 | 175.6109 |
| Virus #6 | 300.8298 | 200.0982 | 50.904   | 239.7819 | 209.1198 |          | 233.2934 |
| Virus #7 | 30.7653  | 100.8739 | 398.2384 | 100.9834 | 175.6109 | 233.2934 |          |

FIG. 7

|    | P1 | P2 | P3 | P4 |
|----|----|----|----|----|
| P1 | 1  | 0  | 1  | .3 |
| P2 | 0  | 1  | .6 | 1  |
| P3 | 0  | .6 | 1  | 1  |
| P4 | .3 | 0  | 1  | 1  |

FIG. 9

The Set of Virus Actors

| | Virus #1 | Virus #2 | Virus #3 | Virus #4 | Virus #5 | Virus #6 | Virus #7 |
|---|---|---|---|---|---|---|---|
| n-gram#1 | 10 | 0 | 50 | 30 | 5 | 10 | 30 |
| n-gram#2 | 30 | 70 | 2 | 1 | 9 | 20 | 50 |
| n-gram#3 | 20 | 32 | 100 | 45 | 10 | 5 | 40 |
| n-gram#4 | 2 | 3 | 60 | 40 | 80 | 4 | 2 |
| n-gram#5 | 5 | 49 | 90 | 7 | 60 | 10 | 6 |
| n-gram#6 | 9 | 2 | 22 | 34 | 22 | 1 | 0 |

The Set of n-gram Actors

FIG. 12

| | n-gram#1 | n-gram#2 | n-gram#3 | n-gram#4 | n-gram#5 | n-gram#6 |
|---|---|---|---|---|---|---|
| n-gram#1 | | 31.3976 | 10.9033 | 48.349 | 9.3793 | 39.2982 |
| n-gram#2 | 31.3976 | | 40.5918 | 98.0022 | 39.0938 | 12.3872 |
| n-gram#3 | 10.9033 | 40.5918 | | 42.9078 | 32.215 | 58.0929 |
| n-gram#4 | 48.349 | 98.0022 | 42.9078 | | 16.7832 | 49.5732 |
| n-gram#5 | 9.3793 | 39.0938 | 32.215 | 16.7832 | | 68.9833 |
| n-gram#6 | 39.2982 | 12.3872 | 58.0929 | 49.5732 | 68.9833 | |

FIG. 13

|    | P1 | P2 | P3 | P4 | P5 |
|----|----|----|----|----|----|
| P1 | 1  | 1  | 0  | 0  | 0  |
| P2 | 1  | 1  | 1  | 0  | 1  |
| P3 | 0  | 1  | 1  | 0  | 1  |
| P4 | 0  | 0  | 0  | 1  | 0  |
| P5 | 0  | 1  | 0  | 0  | 0  |

FIG. 14

1810 Euclidean distance formula $$d_{ij} = \sqrt{\sum_{k=1}^{m}[(x_{ik}-x_{jk})^2 + (x_{ki}-x_{kj})^2]}$$

1820 Correlation coefficient formula $$c_{ij} = \frac{\sum(x_{ki}-M_{*i})(x_{kj}-M_{*j}) + \sum(x_{ik}-M_{*i})(x_{jk}-M_{j*})}{\sqrt{\sum(x_{ki}-M_{*i})^2 + \sum(x_{ik}-M_{*i})^2}\sqrt{\sum(x_{kj}-M_{*j})^2 + \sum(x_{jk}-M_{j*})^2}}$$

We normalize each malware vector in the family and create an average vector for that malware family. Then a cosine similarity matrix is created comparing the malwares to each other and to the average malware vector. We then obtain how similar those malware are to the average vector for that family.

Family, with similarity scores to the average vector of this family:
  Chiton.t  Sality.ab  Slaman.a  Slaman.b  Slaman.c  Slaman.d  Slaman.f
0.39183113 0.07104826 0.89500671 0.92112075 0.89709911 0.92259195 0.92677663
  Slaman.g  Slaman.h  Slaman.i  Slaman.j  Texel.a  Texel.c  Texel.f
0.91690507 0.88581112 0.89706797 0.86114043 0.85730602 0.85715554 0.89457066
  Texel.g  Texel.h  Texel.j  Texel.l
0.89326477 0.89385601 0.85715554 0.87928455

Mean: 0.817722

Starting Pruning:

Maximum similarity - each score:
0.5349455 0.8557284 0.03176992 0.005655881 0.02967752 0.004184675 0 0.009871556
0.04096551 0.02970865 0.0656362 0.06947061 0.06962109 0.03220597 0.03351186
0.03292062 0.06962109 0.04749208

Calculate (Mean*2): 0.230940

Removed 2 malwares that were lower than the Mean*2:
  Sality.ab      Chiton.t
  0.07104826    0.3918311

After pruning:

Slaman.a Slaman.b Slaman.c Slaman.d Slaman.f Slaman.g Slaman.h Slaman.i
0.8950067 0.9211207 0.8970991 0.9225920 0.9267766 0.9169051 0.8858111 0.8970680
 Slaman.j Texel.a Texel.c Texel.f Texel.g Texel.h Texel.j Texel.l
0.8611404 0.8573060 0.8571555 0.8945707 0.8932648 0.8938560 0.8571555 0.8792846

New Mean: 0.938448

SOFTWARE ANALYSIS SYSTEM AND METHOD OF USE

CROSS-REFERENCE TO RELATED APPLICATIONS

This application claims the benefit of U.S. Provisional Application No. 61/483,238, filed May 6, 2011, entitled "Malware Static Analysis Techniques Using a Multidisciplinary Approach," which is hereby incorporated by reference in its entirety.

BRIEF DESCRIPTION OF THE DRAWINGS

FIG. 4 shows a two-mode weighted matrix where one set of actors are configured to be n-grams and the other set of actors are virus programs, as per an aspect of an embodiment of the present invention.

FIG. 6 expresses a method of converting a two-mode matrix into a one-mode matrix, as per an aspect of an embodiment of the present invention.

FIG. 7 shows a result of applying the conversion method to a weighted two mode matrix, as per an aspect of an embodiment of the present invention.

FIG. 9 illustrates an image matrix of software program families, as per an aspect of an embodiment of the present invention.

FIG. 12 shows a matrix with two sets of actors where the actors are virus programs and respective n-gram counts of the programs in a virus program family, as per an aspect of an embodiment of the present invention.

FIG. 13 shows a result of applying the conversion method to a weighted two mode matrix, as per an aspect of an embodiment of the present invention.

FIG. 14 illustrates an image matrix of sequence of instructions (SOI) clusters, as per an aspect of an embodiment of the present invention.

FIG. 18 illustrates an Euclidean distance formula and a correlation coefficient formula, as per an aspect of an embodiment of the present invention.

FIG. 19 illustrates an example of calculating a similarity ratio for a new piece of software versus a number of viruses, as per an aspect of an embodiment of the present invention.

DETAILED DESCRIPTION OF EMBODIMENTS

Embodiments of the present invention may cluster software programs into software families, generate a signature for each software family, or identify unknown software as part of a software family, or any combination thereof.

Figure 1:
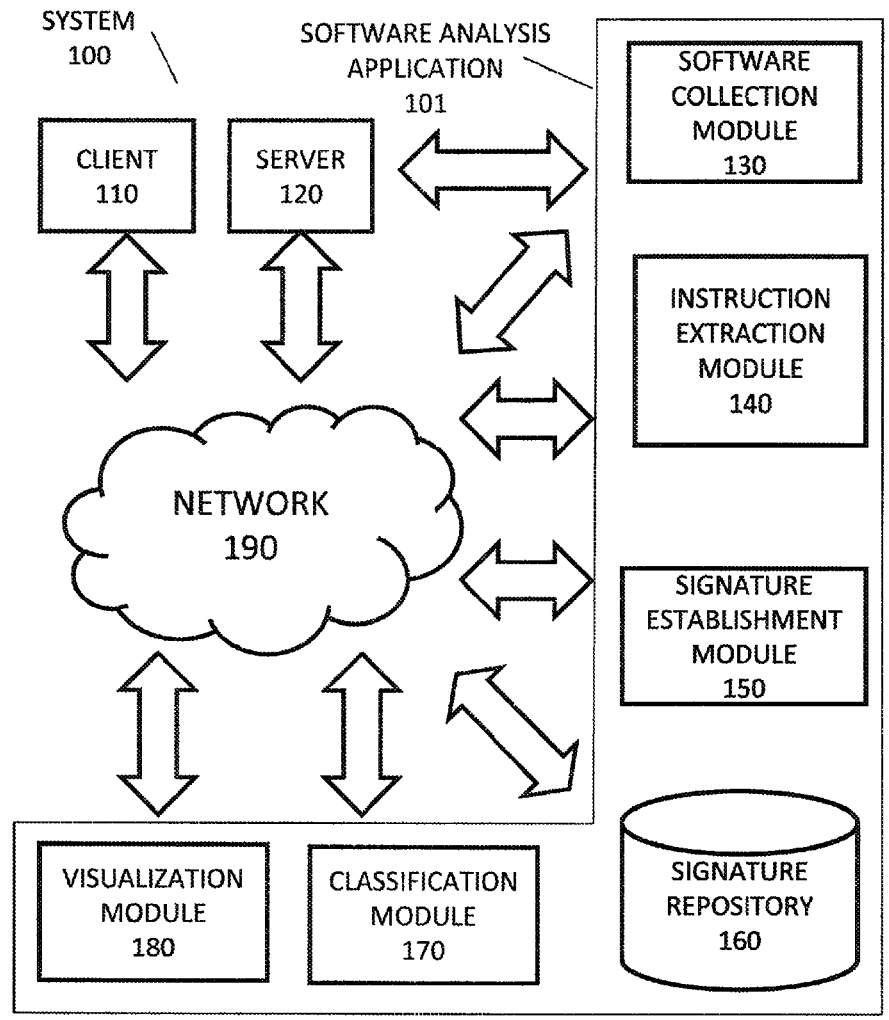
FIG. 1 is a system diagram, as per an aspect of an embodiment of the present invention.

FIG. 1 is a system diagram of some embodiments of the present invention in a network environment configuration. A system 100 may comprise: a software analysis application 101, a client 110, a server 120, a software collection module 130, an instruction extraction module 140, a signature establishment module 150, a signature repository 160, a classification module 170, a visualization module 180, a network 190 or any combination thereof. In some embodiments, the client 110 may request to classify a software program. The server 120 may receive the request and manage the software analysis application 101 to classify the software program to a software family. The classification information may be returned to the client 110. In some embodiments, information may be communicated between the software analysis application 101, the client 110 and the server 120 directly and/or via a network 190 or through an internet. In some embodiments, the software collection module 130 may filter out multiple software programs based on certain configurations. The instruction extraction module 140 may extract op-codes, a portion of machine language instructions that specifies a programmed operation to be performed, from the software program. The signature establishment module 150 may cluster the multiple software programs into software families and generate a signature for each software family. The signature repository 160 may store the generated signatures. The classification module 170 may receive a software program, obtain a signature for the software program, and classify the software program to a respective software family. The visualization module 180 may display useful information to study the structure of a software program.

The software analysis application 101 may be any combination of the modules 110, 120, 130, 140, 150, 160, 170, 180 and 190. In some embodiments, the software analysis application 101 may comprise: the instruction extraction module 140 and the signature establishment module 150. In other embodiments, the software analysis application 101 may comprise: the instruction extraction module 140, the signature establishment module 150 and the classification module 170. In other embodiments, the software analysis application 101 may comprise: the signature repository 160 and the signature visualization module 180.

Communication between modules can vary based on composition of the modules in the software analysis application 101. For example, in some embodiments, a software collection module 130 may collect software programs and filter out the programs based on certain configurations. The filtered output can be forwarded to an instruction extraction module 140 to retrieve sequences of instructions (SOIs) (e.g., sequences of assembly instructions grouped in a certain manner) of the programs. The SOIs and the programs may be fed into a signature establishment module 150 to group the programs into program families and to generate signatures for the families. The generated signatures can be stored into a signature repository 160. In other embodiments, a client 110 may submit a software program to a server 120 via an internet in order to analyze the software program. The server 120 may forward the program to an instruction extraction module 140 to retrieve SOIs of the program. The extracted SOIs can be forwarded to a signature establishment 150 to generate a signature of the program. The generated signature may be stored in signature repository 160. Also, the generated signature can be forwarded to a classification module 170 to classify a software program family for the forwarded program. The client 110 also can visualize analysis of the software program and/or the software program families using a visualization module 180. In some embodiments, the instruction extraction module 140 may receive a software program from a client 110, a server 120, or the collection module 130. The signature establishment module 150 may receive extracted op-codes from the instruction extraction module 140. The classification module 170 may receive a testing software program from the client 110 or a request from the server 120. The classification module 170 may look into a signature repository 160 to find a signature for the testing software program or may send the software program to the signature establishment module 150 to generate the signature. The visualization module 180 may retrieve a software program from the signature repository 160 and/or send a software program to the signature establishment module 150 and/or to the classification module 170 to generate data necessary for visualizing information of the software.

Figure 2:
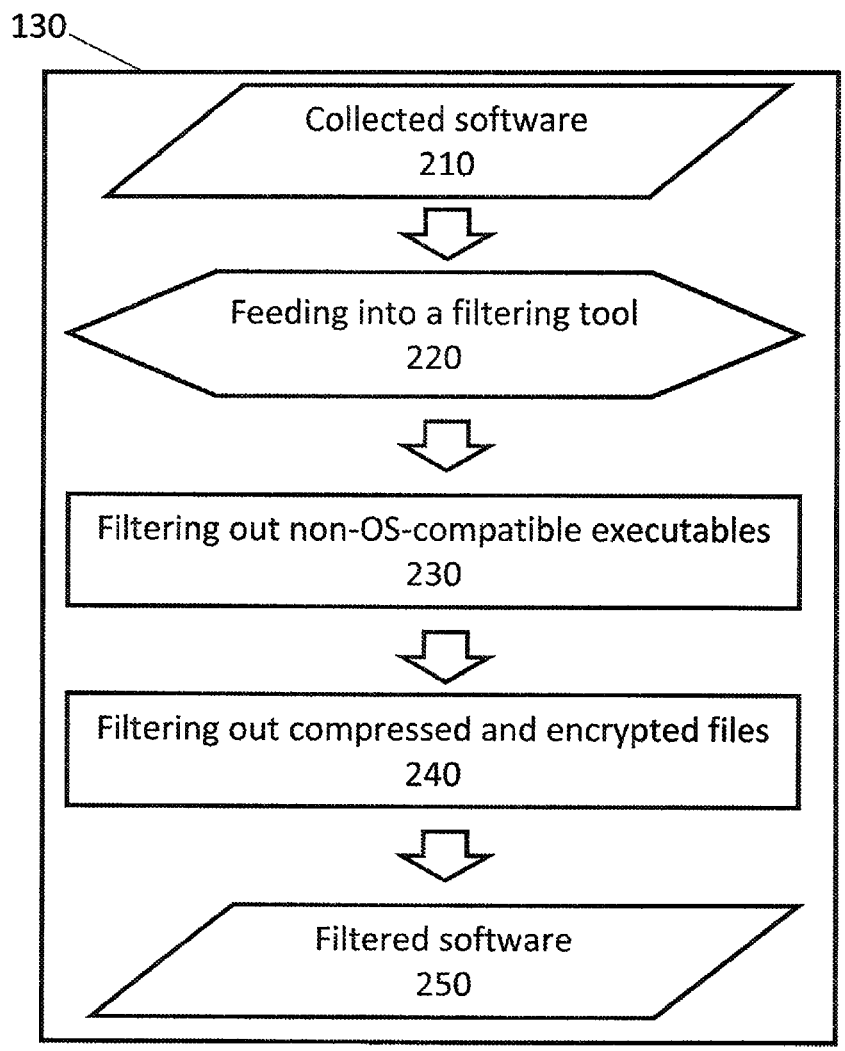
FIG. 2 is a flow diagram of a software collection module, as per an aspect of an embodiment of the present invention.

FIG. 2 is a flow diagram for the software collection module 130. The software collection module 130 may be configured with various settings to filter out software programs with certain criteria. In 210, the software collection module 130 may receive software programs. In 220, the software collection module 130 may feed the received software programs into a filtering tool or tools such as PEiD Jibz which filters out software programs based on user configurations. For example, in 230, the tool may filter out operating system ("OS") non-compatible programs. As another example, in 240, the tool may filter out software programs which are either compressed or encrypted. The tool can be configured to have any combination of filters, including filters not described herein. In some embodiments, for example, the tool is configured to filter out all of non-Windows XP executables, compressed executables and encrypted executables where, in other embodiments, the tool may filter out only compressed executables. The software collection module 130 may return the filtered executables by the tool.

Figure 3:
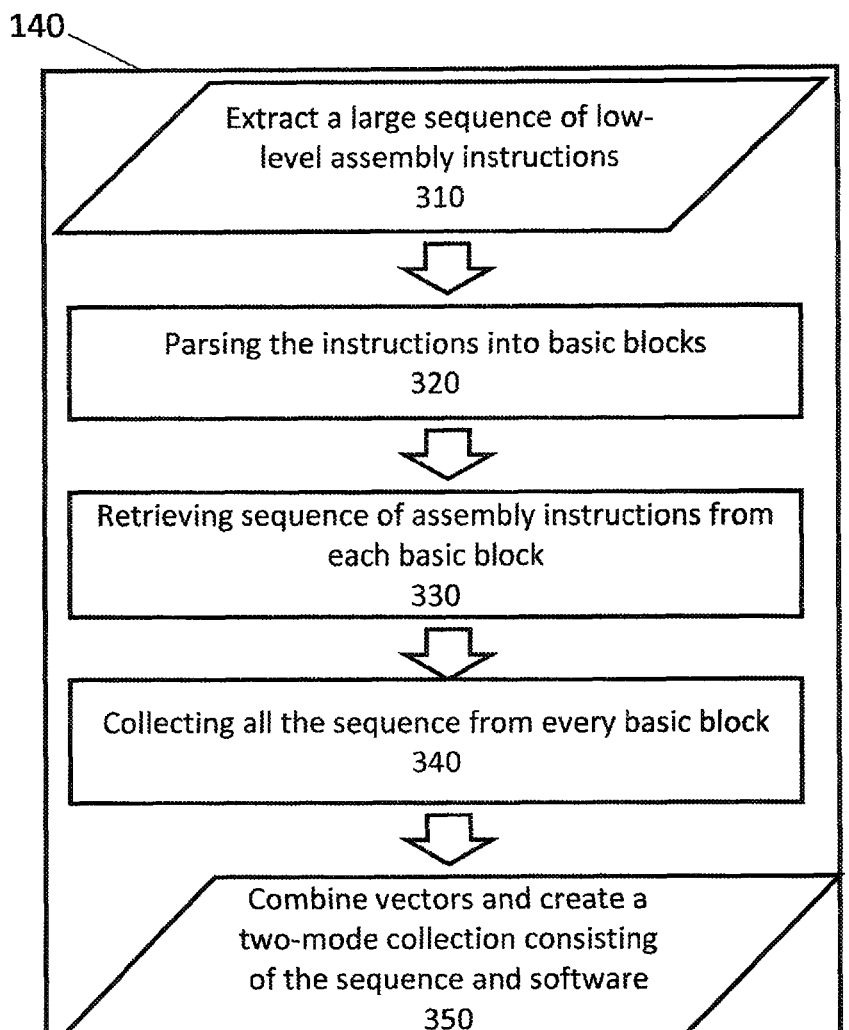
FIG. 3 is a flow diagram of an instruction extraction module, as per an aspect of an embodiment of the present invention.

FIG. 3 is a flow diagram for the instruction extraction module 140. A software program is composed of byte sequences of binary codes. In 310 the instruction extraction module 140 may extract an SOI, which may make up the binary codes. For example, when the instruction extraction module 140 receives a software program as an executable, the instruction extraction module 140 can read the binary assembly instructions of the program without executing the program. The binary assembly instructions may be grouped into a large segment of the instructions. A gram is defined as a sequence of a certain number of bytes of the binary assembly instructions. In some embodiments, the number of the bytes for the sequence is four but it can be any number. As explained above, a SOI can be a sequence of assembly instructions grouped in a certain manner. For example, in some embodiments, SOI can be defined as a group of two sequential grams ("bi-grams"). In other embodiments; the instruction extraction module 140 may combine each four byte sequence into one gram and treat a sequence of n number of grams ("n-grams") as a SOI. In other embodiments, the instruction extraction module 140 may treat assembly instructions of an application programming interface ("API") as a SOI.

In 320 the software program may be parsed into basic blocks. A basic block may be a segment of code that has one entry point (e.g., no code within the segment is the destination of a jump instruction), one exit point and no jump instructions contained within it (e.g., a sequence of instructions which are all executed if the first one in the sequence is executed).

In 330, n-grams may be retrieved from the basic blocks. For example, if a basic block is composed of nine grams as "AABCDASHD"; assuming that each letter represents an instruction with no jump instructions contained, the instruction extraction module 140 can retrieve 8 bi-grams ("AA", "AB", "BC", "CD", "DA", "AS", "SH" and "HD"), 7 tri-grams ("AAB", "ABC", "BCD", "CDA", "DAS", "ASH" and "SHD"), or 6 quad-grams ("AABC", "ABCD", "BCDA", "CDAS", "DASH" and "ASHD") from the basic block.

In 340, based on retrieved SOIs from a software program, the instruction extraction module 140 may count distinct SOIs retrieved from the program. The output of the collection may be represented as a vector in n-dimensional space with n being the number of the distinct instruction sequences.

In 350, the instruction extraction module 140 may combine the vectors of the software programs and create a two-mode weighted matrix of two set of actors: SOIs and software programs. A one-mode Matrix is composed of one set of actors whereas a two-mode matrix is composed of two sets of actors. In a two-mode matrix, the matrix representation is $AB_{n \times m}$ where n is the number of first actors ("A"), m is the number of second actors ("B") and the matrix is composed of n numbers in a row and m numbers in a column.

For example, FIG. 4 shows a two-mode weighted matrix in some embodiments where the first actors are n-grams and the second actors are virus programs. In the embodiment in FIG. 4, the instruction extraction module 140 extracted six distinct n-grams from seven virus programs. The numbers in the matrix represent a total count of n-grams in the virus programs. For example, the number 32 in the second row matrix in FIG. 4 may also suggest that the virus #1 comprises: 10 n-grams#1, 30 n-grams#2, 20 n-grams#3, 2 n-gram#4, 5 n-grams #5 and 9 n-grams #6.

Figure 5:
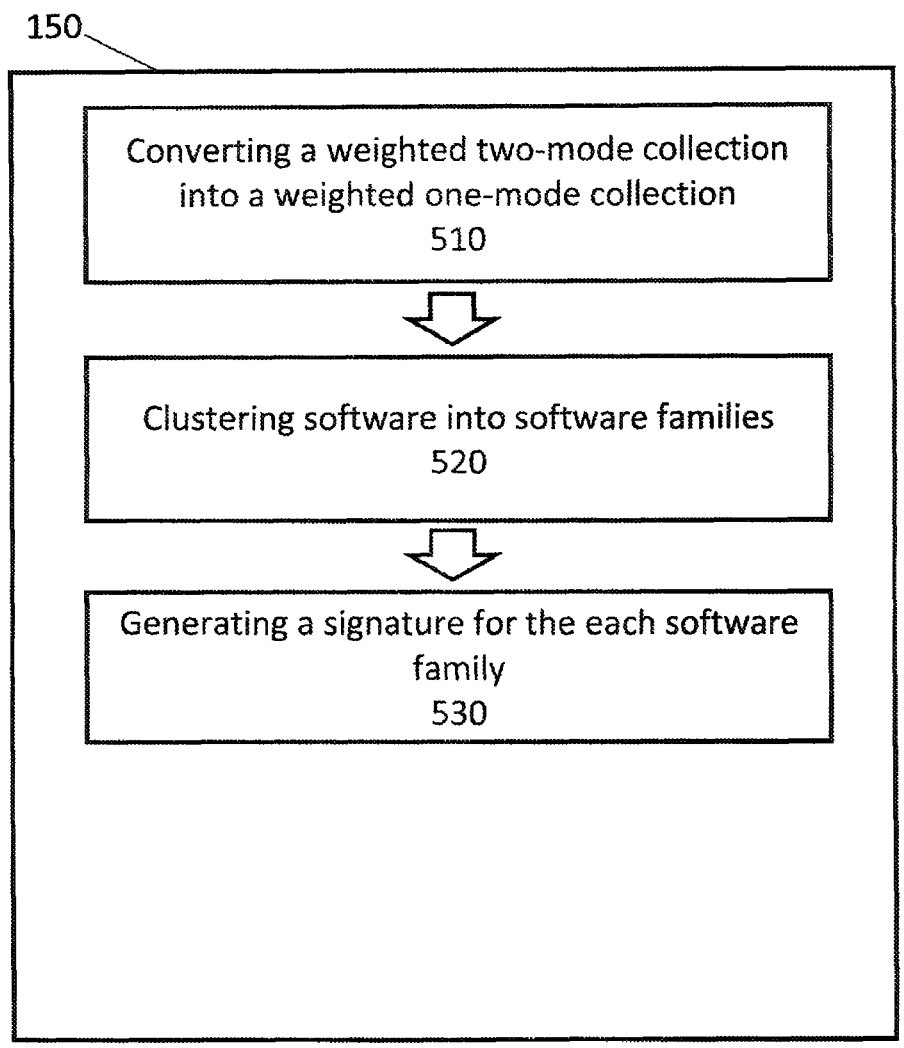
FIG. 5 is a flow diagram of a signature establishment module, as per an aspect of an embodiment of the present invention.

FIG. 5 is a flow diagram for the signature establishment module 150. In 510, the signature establishment module 150 may convert a two-mode matrix into a one-mode matrix which has one set of actors, software programs. In 520, the signature establishment module 150 may cluster the software programs into software families. In 530, the signature establishment module 150 may generate a signature for software families. Details on 510, 520 and 530 are discussed below.

In 510, the signature establishment module 150 may convert the two-mode matrix into the one-mode matrix of software programs. FIG. 6 expresses a method of converting a two-mode matrix into a one-mode matrix. A weighted two-mode matrix of A, a first set of actors, and B, a second set of actors, may be converted to a one-mode weighted matrix as shown in 610. In some embodiments, using the conversion illustrated in 610, a weighted two-mode matrix of $AB_{n \times m}$ can be converted into a weighted one-mode matrix of $AA_{n \times m}$ by finding $A_{n \times m}$ where $aa_{ij}$, a matrix element in the ith row and the jth column (i≠j), can be calculated using the formula in 610. Note that $aa_{ij}=aa_{ji}$: $ab_{ik}$ is a matrix element of the matrix $AB_{n \times m}$ in the ith row and the kth column and $ab_{jk}$ is a matrix element of the matrix $AB_{n \times m}$ in the jth row and the kth column. Similarly a weighted two-mode matrix of $AB_{n \times m}$ can be converted into a matrix of $BB_{m \times m}$ where $bb_{ij}$ $bb_{ji}$ and a value of $bb_{ij}$ equals the value calculated using the formula in 620. Note that $ab_{ki}$ is a matrix element of the matrix $AB_{n \times m}$ in the kth row and the ith column and $ab_{kj}$ is a matrix element of the matrix $AB_{n \times m}$ in the kth row and the jth column.

For example, FIG. 7 shows a result of applying the conversion to the weighted two mode matrix in FIG. 4 in some embodiments. The output of the conversion is one mode matrix. The set of actors in FIG. 7 is a set of virus programs: Virus#1, Virus#2, Virus#3, Virus#4, Virus#5, Virus#6 and Virus#7. The matrix elements may represent the strength of the ties between actors relative to SOIs extracted from the actors. For example, in the embodiments in FIG. 7, the strength of the tie between Virus #7 and Virus #3 (398.2384) is greater than the strength of the tie between Virus #7 and Virus #1 (30.7653). The difference may suggest that the Virus #7 has a composition of n-grams that is closer to Virus #3 than Virus #1.

Figure 8:
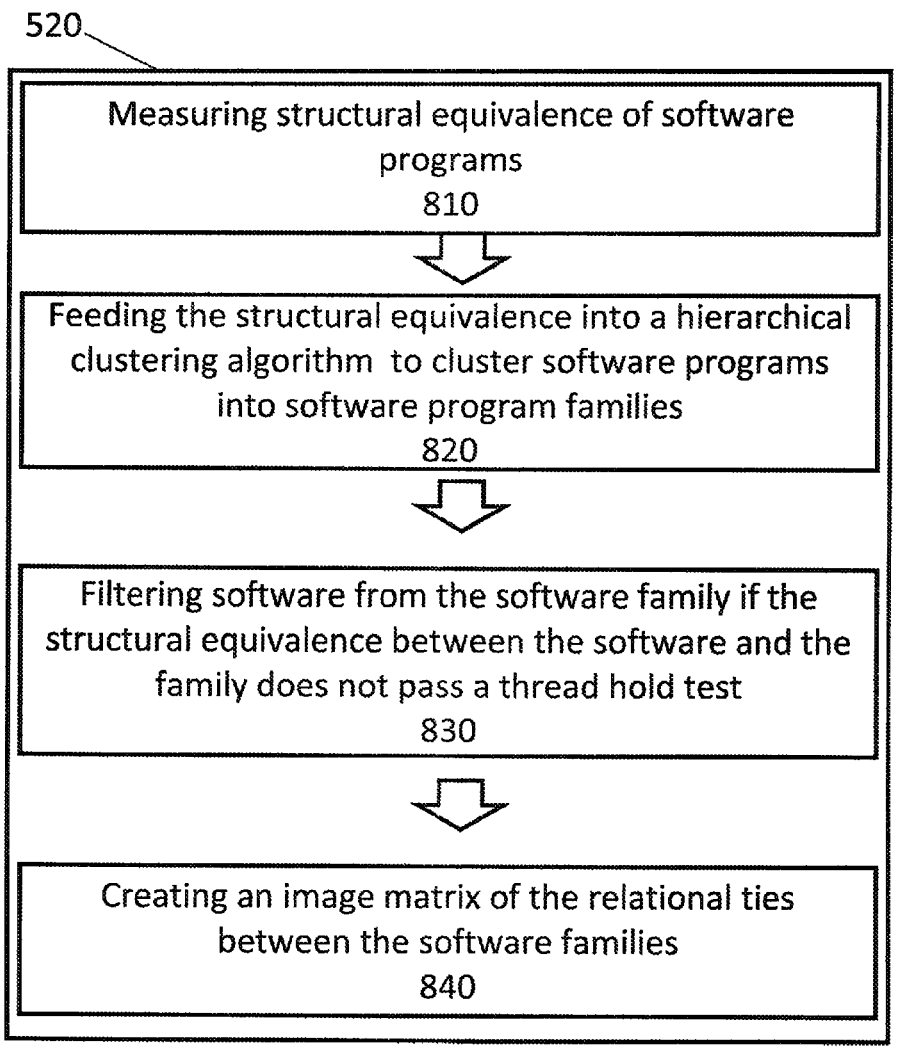
FIG. 8 is a flow diagram of clustering software programs into software families, as per an aspect of an embodiment of the present invention.

In 520, the signature establishment module 150 may cluster the software programs into software families. FIG. 8 is a flow diagram illustrating details of clustering software programs into the software families. In 810, the signature establishment module 150 may cluster the software programs into software families through a use of structural equivalence. Structural equivalence may be measured as Euclidean distance or as a correlation coefficient. Other measurement methods may also be used. The signature establishment module 150 may pair software programs and measure the structural equivalence of the pair. The signature establishment module 150 may create a matrix of the structural equivalence by measuring the structural equivalences for all possible pairs of the software programs and combine the structural equivalences as a matrix. The matrix of structural equivalence may show the relative structural similarities of each pair of actors. For example, in some embodiments using Euclidean distance as the measure of structural equivalence, the Euclidean distance formula 1810 in FIG. 18 can be used to calculate the structural equivalence, where $d_{ij}$ represents the Euclidean distance between actors i and j; a is the number of actors in the relational matrix; and $x_{ij}$ is the element in the relational matrix. In other embodiments using a correlation coefficient as the measure of structural equivalence, the correlation coefficient formula 1820 can be used, where $c_{ij}$ is the correlation coefficient of actors i and j; $M_{i*}$ is the mean of the values in row i; $M_{*i}$ is the mean of the values in column i; and $x_{ij}$ is the element in the relational matrix.

In 820, the structural equivalence may be fed into a hierarchical clustering algorithm that may create clusters of software programs based on the structural equivalence matrix. The hierarchical clustering algorithm is a method of cluster analysis which seeks to build a hierarchy of clusters. The software programs may be clustered into distinct clusters, families of the software programs.

In 830, the signature establishment module 150 may filter out software programs in a particular software family. For the filtration, the signature establishment module 150 may calculate an average ratio of the software family as a set of SOI counts over total SOI counts within the family. For example, if a software family is comprised of 50 SOIs of type A, 100 SOIs of type B and 350 SOIs of type C, the average ratio of the family can be represented as a vector of [type A SOI, type B SOI, type C SOI]=[50/(50+100+350), 100/(50+100+350), 350/(50+100+350)]=[0.1, 0.2, 0.7]. Also, similar to the way the ratio of the family is calculated, the signature establishment module 150 may calculate a ratio of each software program in the software family as a set of SOI counts of the program over total SOI counts within the software program. The signature establishment module 150 may remove software programs from the software family if the structural equivalence value between the average ratio of the family and the ratio of the software program does not exceed a certain threshold value. The threshold value may be any decimal number between 0 and 1 if the measure of the structural equivalence uses the correlation coefficient. In some embodiments where correlation efficient is the measure of the structural equivalence, the threshold value of 0.95 may be used as the criterion, but the value can be any other number. The signature establishment module 150 may repeat the filtration until structural equivalence values between the family and all the remaining software programs exceed the threshold value. For example, let's assume that a software family #1 is initially formed with four distinct software programs (A, B, C and D) after the hierarchy clustering algorithm is applied. The average ratio of the family and individual programs can be calculated based on the formula 1820 in FIG. 18. The signature establishment module 150 may calculate the correlation efficient between the family and each program using the calculated average ratios. If the calculated structural equivalences are 0.98 (A), 0.97 (B), 0.85 (C) and 0.95 (D) and the filtering criterion is 0.95, the filtration process may apply to the program C which may result in eliminating the program C from the family. The average ratio of the family is re-calculated with A, B and D because any elimination may cause the change of underlying SOI counts of the family. This filtration process may be reiterated until all the programs in the family can have the correlation efficient value greater than 0.95.

In 530, the signature establishment module 150 may generate the signature for software families. In some embodiments, the signature establishment module 150 may establish the average ratio of the software family as one of possible signatures for the software family.

Figure 9:
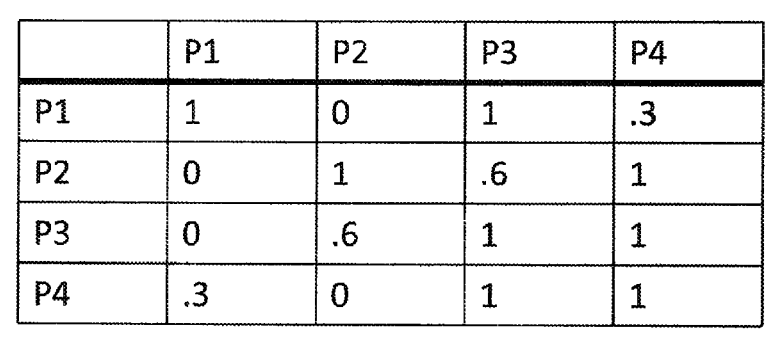

FIG. 9 illustrates an image matrix of software program families. In 840, the signature establishment module 150 may create an image matrix which may show relational ties between software families. Given that the structural equivalence matrix of the software families are already calculated, to determine the relational ties between the families, one may use a specific criterion for deciding if there is a tie (e.g., represented as one) or a zero (e.g. if there is no tie). Any criterion can be used for the decision. Some exemplary criteria are listed as follows:

Perfect fit: This criterion is used for dichotomous relations. For a perfect fit a block must either be all 0's or all 1's. Hence the relational tie in the image matrix is a 1 only if the block is all 1's and 0 if it is all 0's.

Zeroblock: This criterion is used for dichotomous relations. The relational tie in the image matrix is a 0 if the entire block is filled with 0's otherwise it is a 1.

Oneblock: This is a criterion used for dichotomous relations. It is the opposite of a zeroblock in that the relational tie in the image matrix is a 1 if the entire block is filled with 1's otherwise it is 0.

α Density criterion: This is a criterion used for dichotomous relations. The previous criteria rely on the blocks being either fully 1's or 0's and real world data is rarely in that form. Therefore a density threshold is defined so that if the density of the block is smaller than the threshold its corresponding relational tie in the image matrix is a 0 else it is a 1. This threshold is usually the calculated density of the whole relation.

Maximum value: This is a criterion used for multi-valued relations, where blocks that contain only small values in them are considered zeroblocks, and blocks that contain any large values are considered oneblocks. This is similar to the zeroblock criterion, but for multi-valued relations.

Mean value: This also is a criterion used for multi-valued relations, where the mean value of the entire relation is calculated. Then the mean of each block is calculated and if it is greater than the relation's mean then it is a oneblock, otherwise it is a zeroblock. It is similar to the density criterion except that instead of using a density value it uses the mean value.

As an example of showing an image matrix as a result of applying the maximum value criterion, FIG. 9 illustrates the output matrix of software families after the criterion is applied. In the embodiment in FIG. 9, the image matrix may suggest that software programs are clustered into four families (P1, P2, P3 and P4) and the relational ties between the families are either one, if the relational tie value is greater than the maximum value, or zero. For example, FIG. 9 may show that the relational tie from the family P2 to the family P3 (0.6) is strong compared to the tie from P2 to P1 (0).

Figure 10:
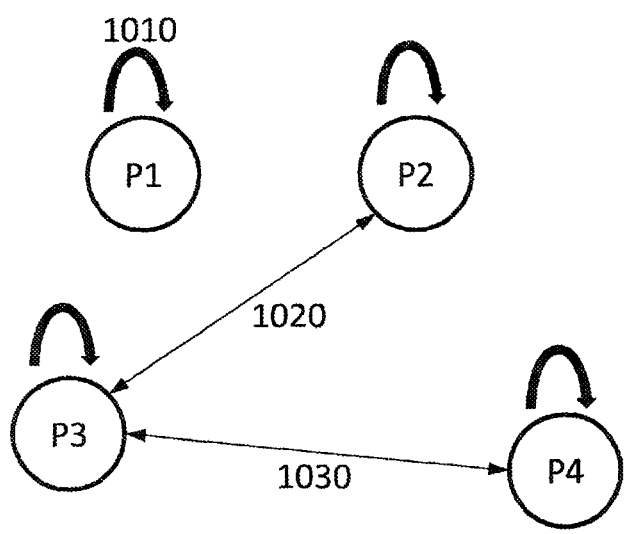
FIG. 10 shows a version of result display of a visualization module, as, per an aspect of an embodiment of the present invention.

FIG. 10 shows one version of a result display of the visualization module 180 in some embodiments where the image matrix in FIG. 9 is fed into the visualization module 180. In FIG. 9 the image matrix shows that the relational tie value from P1 to P1 is "one". An arrow may represent a tie between families. For simplicity sake, a number of 0.5 and greater may be rounded up to 1 and signify a tie, while a number less then 0.5 may be rounded down to signify no tie. Note that ties and/or the strength of the ties may be represented in many other manners. Referring to FIG. 10, the visualization module 180 may visualize the relational ties of FIG. 9. For example, an arrow 1010 may be displayed originating from P1 and forwarding back to P1 because the value in FIG. 9 is 1 for P1 and P1 (note that this is also true for the relational tie of P2 to P2, P3 to P3 and P4 to P4). Another arrow 1020 between P2 and P3 and 1030 between P3 and P4 in FIG. 10 may visualize the relational tie between these families as a tie greater than or equal to 0.5. The visualization module 180 may provide information to a software analyst as a software analyst may see and may further analyze relationships between software that were not apparent. Also from the image matrix one may create an equivalent graph and visualize the analysis of the software families in this manner.

Figure 11:
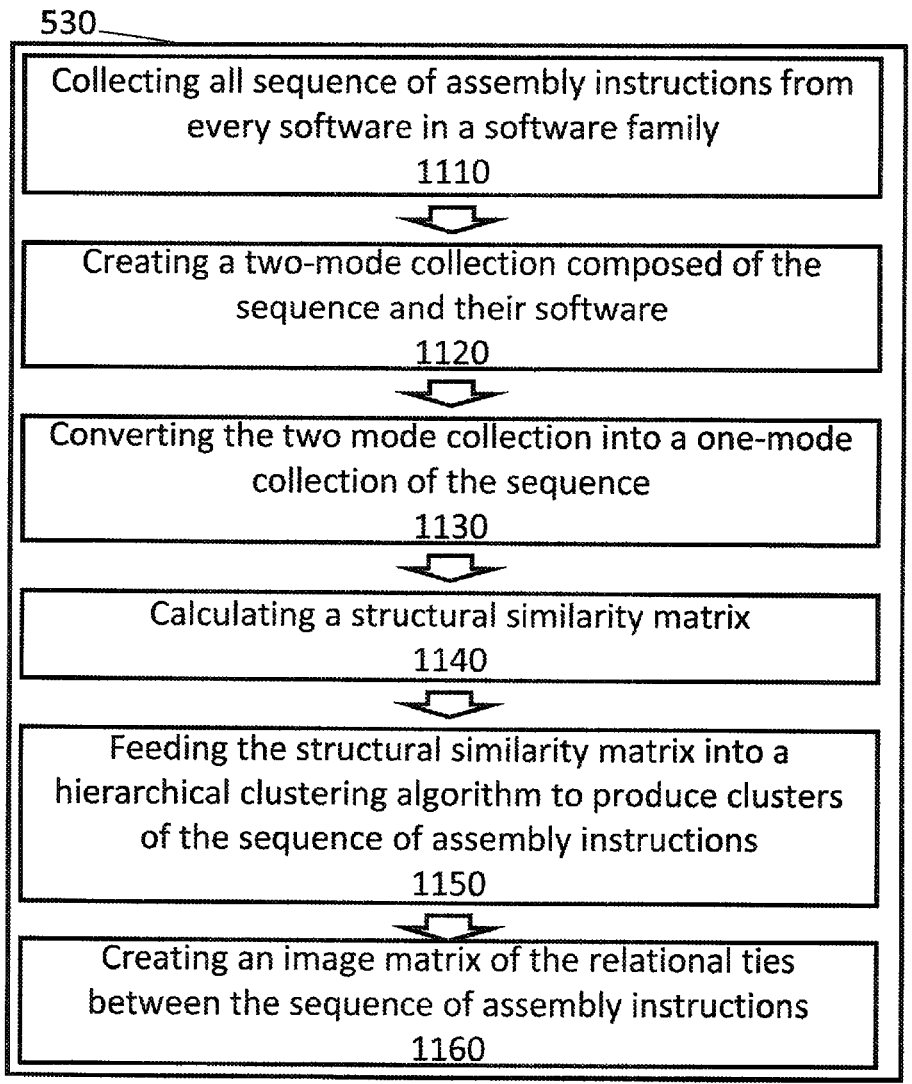
FIG. 11 is a flow diagram of generating an image matrix of multiple sequences of instructions for a software family, as per an aspect of an embodiment of the present invention.

FIG. 11 is a flow diagram of generating an image matrix of one mode matrix where the actors are SOI clusters of the software family. Generating the image matrix of SOI clusters is similar to generating the image matrix of software programs. One difference can be that the actors in FIG. 8 are software programs whereas the actors in FIG. 11 are SOI clusters.

In 1110, the signature establishment module 150 may count all the SOIs of software programs within a particular software family. In 1120, the signature establishment module 150 may create a two mode matrix of SOIs and software programs. For example, FIG. 12 shows a matrix with two sets of actors in some embodiments where the two sets of actors are virus programs and respective n-gram counts of the programs in a virus program family. In the embodiment in FIG. 12, the instruction extraction module 140 extracted six distinct n-grams from seven virus programs. The numbers in the matrix represent a total count of n-grams in virus programs. For example, the number 32 in the third row and second column means the total count of the n-grams#3 in the virus program #2. The matrix in FIG. 12 may also suggest that the virus #1 comprises: 10 n-grams#1, 30 n-grams#2, 20 n-grams#3, 2 n-gram#4, 5 n-grams #5 and 9 n-grams #6.

In 1130, the two mode matrix of the SOIs and the software programs may be converted into the one mode matrix of SOIs. FIG. 13 shows a result of applying the conversion method to the two mode matrix in FIG. 12. The set of actors in FIG. 13 is a set of six distinct n-grams extracted from one software family: n-gram #1, n-gram #2, n-gram #3, n-gram #4, n-gram #5 and n-gram #6. The matrix elements may represent the strength of ties between the set of n-grams relative to the software family from which it was extracted. For example, the matrix in FIG. 13 may suggest that the strength of the tie between n-gram #6 and n-gram #1 (39.2982) is less than the strength of tie between n-gram #6 and n-gram #5 (68,9833).

In 1140, the signature establishment module 150 may pair two SOIs and calculate structural similarity of the pair for all the possible pairs in the software family to create a structural similarity matrix. Structural equivalence may be measured as Euclidean distance or as a correlation coefficient. Other measurement methods may also be used. The matrix of structural equivalence may show the relative structural similarities of each pair of actors. For example, in some embodiments using Euclidean distance as the measure of structural equivalence, the Euclidean distance formula 1810 in FIG. 18 can be used to calculate the structural equivalence. (Note that details on FIG. 18 were set forth earlier in the application.)

In 1150, the signature establishment module 150 may feed the structural similarity matrix into the hierarchical clustering algorithm to produce clusters of the SOIs. FIG. 14 illustrates an image matrix of SOI clusters. In 1160, similar to creating the image matrix of software programs in FIG. 9, the signature establishment module 150 may create the image matrix which may show relational ties between SOI clusters. To determine the relational ties between the n-grams, one may use a specific criterion for deciding if there is a tie represented as one or a zero if there is not. Any criterion can be used for the decision such as Perfect Fit, Zeroblock, Oneblock, a Density Criterion, Maximum Value, Mean Value, or any commonly available criteria in the art, or any combination thereof.

As an example of showing an image matrix as a result of applying the maximum value criterion, FIG. 14 illustrates the output matrix of n-grams after the Maximum criterion is applied. The image matrix in FIG. 14 may suggest that the software family is composed of five distinct types of n-gram clusters (P1, P2, P3, P4 and P5) and the relational ties between the n-gram clusters are either one, if the relational tie value is greater than the maximum value (e.g., 0.5), or zero. For example, the image matrix may suggest that the relational tie from P2 to P3 is strong where the relational tie from P1 to P3 is not.

Figure 15:
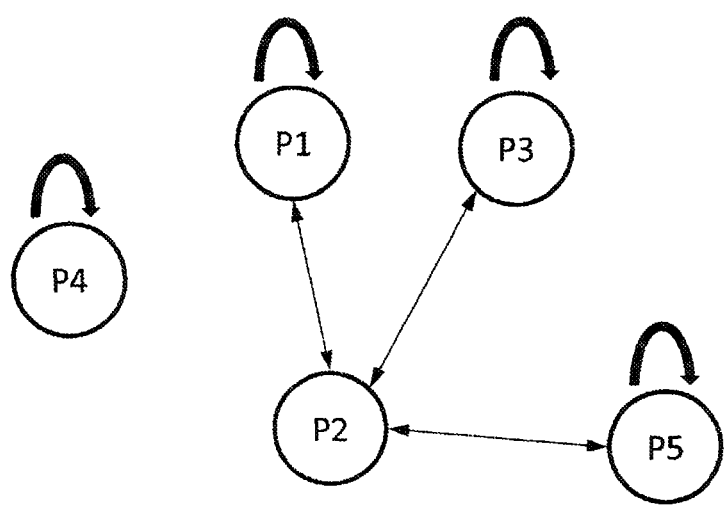
FIG. 15 illustrates a manner of visualizing an image matrix of clusters of SOIs, as per an aspect of an embodiment of the present invention.

FIG. 15 illustrates one way of visualizing the image matrix of SOI clusters. The visualization module 180 may receive the image matrix of SOI clusters and visualize the analysis display similar to the image matrix in FIG. 10. One difference between FIG. 10 and FIG. 15 can be that the actors of the image matrix in FIG. 15 are SOI clusters instead of software families.

Figure 16:
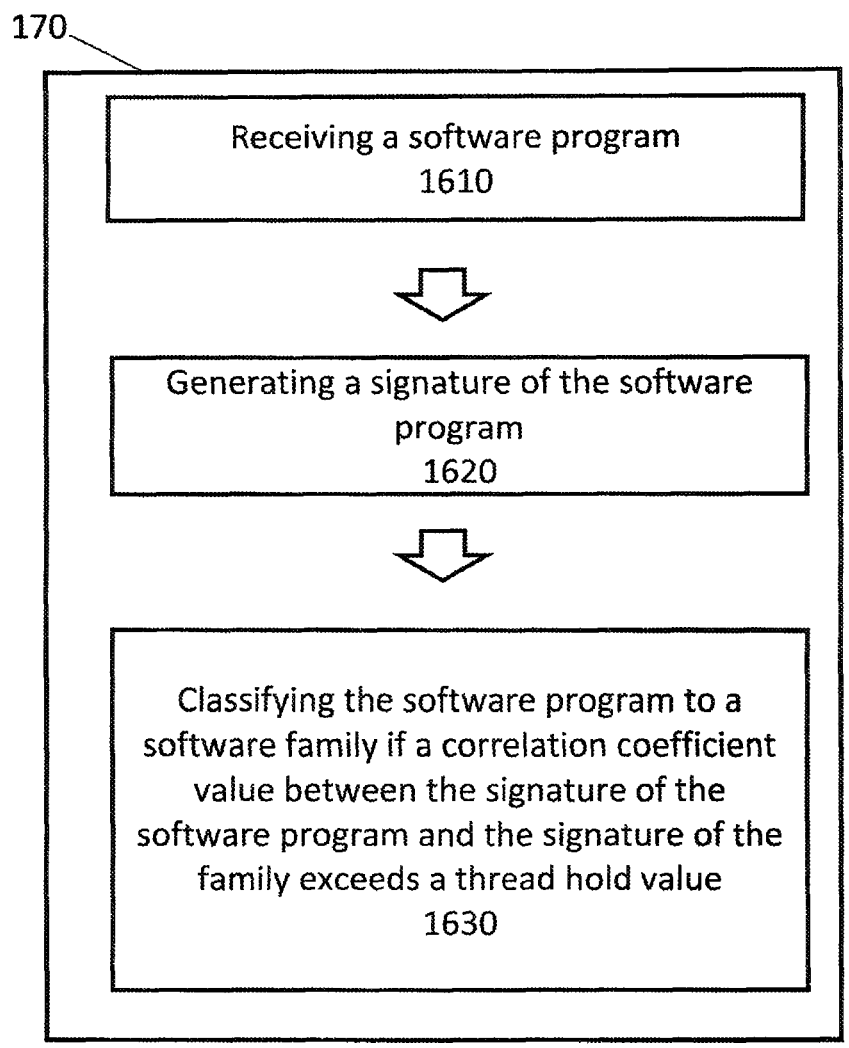
FIG. 16 is a flow diagram of a classification module, as per an aspect of an embodiment of the present invention.

FIG. 16 is a flow diagram for the classification module 170. In 1610, the classification module 170 may receive a sample software program as an input. In 1620, the classification module 170 may obtain a signature of the sample software program by sending the sample to the signature establishment module 150 and receiving the generated signature or by searching the sample from the signature repository 160. In 1630, the classification module 170 may classify the sample software program to a certain software family if the structural equivalence between the signature of the software program and the signature of the family exceeds a certain threshold value. When the measurement method of the structural equivalence is correlation coefficient, the threshold value can be any decimal number between 0 and 1. In some embodiments, 0.95 may be used as the threshold value. Any other value may also be used as the threshold value.

Figure 17:
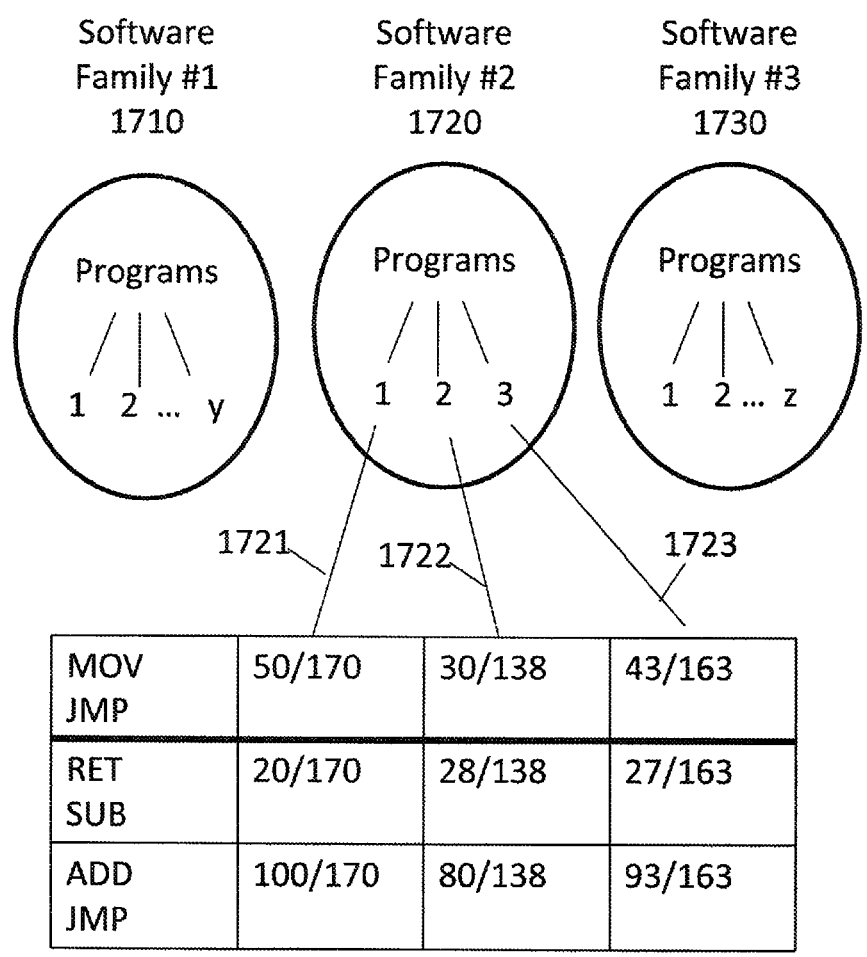
FIG. 17 illustrates various ways of calculating a ratio of n-grams of a software program family, as per an aspect of an embodiment of the present invention.

A signature of a software family can be defined in various ways. FIG. 17 illustrates many ways of calculating a ratio for a software program families. In the embodiment in FIG. 17, as an example, software programs are clustered into three software program families: Software Family #1 (1710), Software Family #2 (1720) and Software Family #3 (1730). Multiple software programs in each family are selected to generate signatures. For example, suppose there are three programs (1721, 1722 and 1723) in Software Family #2 and these include three types of bi-grams: MOV-JUMP, RETURN-SUB and ADD-JUMP. The first program includes 50 MOV-JUMP grams, 20 RETURN-SUB grams and 100 ADD-JUMP grams. The second program includes 30 MOV-JUMP grams, 28 RETURN-SUB grams and 80 ADD-JUMP grams. The third program includes 43 MOV-JUMP grams, 27 RETURN-SUB grams and 93 ADD-JUMP grams. The total bi-gram counts of the programs in Software Family #2 for the first, second and third programs are respectively 170, 138, and 163. In some embodiments, the signature of each member of Software Family #2 can be a vector of the ratio of the set of n-gram counts per total numbers of n-grams in the software itself. So, for example, the signature of the first program would be (50/170, 20/170, 100/170), which is approximately (0.29412, 0.11765, 0.58823). The sum of these three components is approximately 1. In the same way, the signature for the second program would be (30/138, 28/138, 80/138), which is approximately (0.21739, 0.20290, 0.57971). Again these sum to 1. Finally, the signature for the third program would be (43/163, 27/163, 93/163), which is approximately (0.26380, 0.16565, 0.57055). As in the previous cases, these also sum to 1. The signature for the family would be the average of all signatures for the programs in the family. In this example, the signature for the family would be approximately (0.25843, 0.16207, 0.57950), which again sums to 1. Both the signatures of the individual programs and the signatures of the families are unit vectors (i.e., they sum to 1). Similarities may be measured by taking the cosine of the angle between the vectors with a cosine near 1 indicating very similar and a cosine near 0 indicating no similarity. The coherency within a family can be measured by the similarity of the signatures of the individual programs to the signature of the family. The dissimilarity between families can be measured by the dissimilarity of their respective signatures. A new, previously unseen program can be assigned to a family by investigating the similarity of its signature to the signature of each family and assigning it to the family for which it has the highest similarity.

FIG. 19 illustrates an example of calculating a similarity ratio for a new piece of software versus a number of viruses. The first mean similarity ratio for all the viruses is then calculated (e.g., 0.817722). The results can be pruned one or more times to obtain a mean similarity in a range determined to be desirable (e.g., in this example, the final new mean is 0.938448).

It should be noted that the similarities in the examples of FIGS. 17 and 19 were measured by taking the cosine of the angle between the vectors. If the vectors point in the same direction, the cosine of the angle is 1 and they are very similar. If the angle is 90 degrees, then the cosine is of the angle 0 and they have no similarity. In other embodiments, similarity can be measured by a number of other distance or similarity measures. For example, other similarity metrics comprise:

Euclidean: Uses the standard Euclidean (as-the-crow-flies) distance.

Euclidean Squared: Uses the Euclidean squared distance in cases where one would use regular Euclidean distance in Jarvis-Patrick or K-Means clustering.

Manhattan: Uses the Manhattan (city-block) distance.

Pearson Correlation: Uses the Pearson Correlation coefficient to cluster together samples with similar behavior; samples with opposite behavior are assigned to different clusters.

Pearson Squared: Uses the squared Pearson Correlation coefficient to cluster together samples with similar or opposite behaviors (i.e. samples that are highly correlated and those that are highly anti-correlated are clustered together).

Chebychev: Uses Chebychev distance to cluster together samples that do not show dramatic differences; samples with a large difference may be assigned to different clusters.

Spearman: Uses Spearman Correlation to cluster together samples whose profiles have similar shapes or show similar general trends, but whose levels may be very different.

In additional embodiments, a few number of SOIs can be selected and a ratio may be calculated by counting the SOIs in the programs instead of counting all n-grams in the family. In other embodiments, a count of APIs may be used to generate a signature for the family instead of n-gram counts.

In this specification, "a" and "an" and similar phrases are to be interpreted as "at least one" and "one or more." References to "an" embodiment in this disclosure are not necessarily to the same embodiment. "Comprise" and similar phases are to be interpreted as "include but not limited to".

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (e.g., hardware with a biological element) or a combination thereof, all of which are behaviorally equivalent. For example, modules may be implemented using computer hardware in combination with software routine(s) written in a computer language (e.g., C, C++, Fortran, Java, Basic, Matlab) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, the above mentioned technologies may be used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) software signature application. However, one skilled in the art will recognize that embodiments of the invention could be a malware detection application.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method for determining a software signature, comprising:
    performing processing associated with obtaining a software program in a form of a sequence of instructions ("SOI") of the software program;
    performing processing associated with clustering the software program into a software family; and
    performing processing associated with generating a signature for each software family, comprising:
        performing processing associated with calculating an average ratio of the software family as a set of discriminatory SOI counts over total discriminatory SOI counts for the software family;
        performing processing associated with calculating a ratio of each software program in the software family as a set of discriminatory SOI counts over total discriminatory SOI counts for each software program;
        performing processing associated with filtering out each software program if a similarity measure value between the average ratio of the software family and the ratio of the each software program does not exceed a threshold value; and
        performing processing associated with repeating the calculation of the average ratio of the software family and the filtration until the similarity measure value between every software program and the software family exceed the threshold value.

2. The method of claim 1, wherein the performing processing associated with clustering the software program comprises:
    performing processing associated with utilizing a matrix comprising SOI information versus software program information.

3. The method of claim 2, wherein the performing processing associated with clustering the software program comprises:
    performing processing associated with pairing software programs;
    performing processing associated with measuring structural equivalences between the software pairs; and
    performing processing associated with applying a clustering algorithm against the structural equivalences to group the software programs into software families.

4. The method of claim 1, further comprising:
performing processing associated with classifying a previously unclassified software program into the software family, comprising:
    performing processing associated with receiving the previously unclassified software program;
    performing processing associated with generating a ratio of the previously unclassified software program; and
    performing processing associated with classifying the previously unclassified software program as classified into the software family if a similarity measure value between the ratio of the previously unclassified software program and the signature of the software family exceeds a threshold value.

5. The method of claim 2, further comprising:
performing processing associated with converting a matrix of software programs in the software family and a collection of the SOI in the software programs into a matrix of the collection of the SOI representing strength of ties between the SOI;
performing processing associated with pairing all the SOI in the software family;
performing processing associated with measuring structural equivalences between the SOI pairs;
performing processing associated with applying a clustering algorithm against the structural equivalences to group the SOI into SOI families;
performing process associated with generating a image matrix of the relational ties between the SOI families; and
performing processing associated with visualizing the image matrix.

6. The method of claim 1, wherein the SOI comprises:
an Application Programming Interface ("API"); a sequence of n number of low-level assembly instructions; or both.

7. The method of claim 4, further comprising:
performing process associated with storing a generated signature of a software family into a signature repository.

8. The method of claim 1, further comprising:
performing processing associated with classifying a previously unclassified software program into the software family.

9. A system for determining a software signature comprising:
a processor configured for:
performing processing associated with obtaining a software program in a form of a sequence of instructions ("SOI") of the software program;
performing processing associated with clustering the software program into a software family; and
performing processing associated with generating a signature for each software family, comprising:
    performing processing associated with calculating an average ratio of the software family as a set of discriminatory SOI counts over total discriminatory SOI counts for the software family;
    performing processing associated with calculating a ratio of each software program in the software family as a set of discriminatory SOI counts over total discriminatory SOI counts for each software program;

performing processing associated with filtering out each software program if a similarity measure value between the average ratio of the software family and the ratio of the each software program does not exceed a threshold value; and performing processing associated with repeating the calculation of the average ratio of the software family and the filtration until the similarity measure value between every software program and the software family exceed the threshold value.

10. The system of claim 9, wherein the performing processing associated with clustering the software program comprises:

performing processing associated with utilizing a matrix comprising SOI information versus software program information.

11. The system of claim 10, wherein the performing processing associated with clustering the software program comprises:

performing processing associated with pairing software programs;

performing processing associated with measuring structural equivalences between the software pairs; and performing processing associated with applying a clustering algorithm against the structural equivalences to group the software programs into software families.

12. The system of claim 1, further comprising:

performing processing associated with classifying a previously unclassified software program into the software family comprising:

performing processing associated with receiving the previously unclassified software program;

performing processing associated with generating a ratio of the previously unclassified software program; and performing processing associated with classifying the previously unclassified software program as classified into a software family if a similarity measure value between the ratio of the previously unclassified software program and the signature of the software family exceeds a threshold value.

13. The system of claim 10, further comprising:

performing processing associated with converting a matrix of software programs in the software family and a collection of the SOI in the software programs into a matrix of the collection of the SOI representing strength of ties between the SOI;

performing processing associated with pairing all the SOI in the software family; performing process associated with measuring structural equivalences between the SOI pairs;

performing processing associated with applying a clustering algorithm against the structural equivalences to group the SOI into SOI families;

performing process associated with generating a image matrix of the relational ties between the SOI families; and performing processing associated with visualizing the image matrix.

14. The system of claim 9, wherein the SOI comprises:

an Application Programming Interface ("API"); a sequence of n number of low-level assembly instructions; or both.

15. The system of claim 12, further comprising:

performing process associated with storing a generated signature of a software family into a signature repository.

16. The system of claim 9, further comprising:

performing processing associated with classifying a previously unclassified software program into the software family.

* * * * *